(12) United States Patent
Crapart et al.

(10) Patent No.: US 6,767,017 B2
(45) Date of Patent: Jul. 27, 2004

(54) LEAKTIGHT COUPLING

(75) Inventors: René Crapart, Sainte Gemmes d'Andigne (FR); Christophe Blouin, Chateau-Gontier (FR)

(73) Assignee: Hutchinson, Paris (FR)

( * ) Notice: Subject to any disclaimer, the term of this patent is extended or adjusted under 35 U.S.C. 154(b) by 20 days.

(21) Appl. No.: 10/116,533

(22) Filed: Apr. 4, 2002

(65) Prior Publication Data

US 2002/0153670 A1 Oct. 24, 2002

(30) Foreign Application Priority Data

Apr. 5, 2001 (FR) .............................................. 01 04639

(51) Int. Cl.$^7$ ................................................. F02F 1/10
(52) U.S. Cl. ........................ 277/608; 277/602; 277/598; 285/124.5
(58) Field of Search ............................. 285/124.5, 120, 285/1, 124.4, 124.3; 277/598, 602, 608

(56) References Cited

U.S. PATENT DOCUMENTS

| | | | | |
|---|---|---|---|---|
| 3,340,774 A | * | 9/1967 | Brenneke | .................... 92/171.1 |
| 3,570,374 A | | 3/1971 | Stratton | |
| 3,929,356 A | * | 12/1975 | DeVincent et al. | ......... 285/305 |
| 5,010,853 A | * | 4/1991 | Kubis et al. | ............. 123/41.84 |
| 5,944,360 A | | 8/1999 | Crapart | |

FOREIGN PATENT DOCUMENTS

| | | |
|---|---|---|
| FR | 2 759 756 A1 | 8/1998 |
| WO | PC-WO 00/75538 A1 | 12/2000 |

OTHER PUBLICATIONS

French Search Report, Publication No. 0104639, Publication Date: Dec. 20, 2001.

* cited by examiner

*Primary Examiner*—Anthony Knight
*Assistant Examiner*—Enoch Peavey
(74) *Attorney, Agent, or Firm*—Marshall, Gerstein & Borun LLP

(57) ABSTRACT

A leaktight coupling between channels formed in two pieces that bear against each other via an intermediate block having at least one duct passing therethrough suitable for putting the respective channels in each of the pieces into communication with one another, the duct forming a housing for an insert provided with beads. The intermediate block has a tubular insert and a sealing device positioned in register with one of the pieces that is to bear against the intermediate block. The beads of the tubular insert are compressed between a shoulder formed in the duct and the other one of the pieces that is to bear against said intermediate block once the intermediate block is mounted between the two pieces.

14 Claims, 3 Drawing Sheets

LEAKTIGHT COUPLING

The present invention relates to leaktight couplings.

More particularly, the invention provides a leaktight coupling for interconnecting channels formed respectively in first and second rigid pieces that are secured to each other, the leaktight coupling comprising at least one tubular insert including a rigid tubular strength member extending axially between first and second open ends, said first and second ends being covered with respective first and second elastomer beads which project axially beyond the corresponding end of the tubular strength member.

BACKGROUND OF THE INVENTION

The coupling can be used, for example, to establish continuity in channels for passing a fluid in the two pieces which are generally spaced apart from each other by one or more spacers. In practice, the fluid can be oil circulated under a pressure that is variable and possibly pulsating, lying in the range 0 to several tens of bars, and at temperature that is also highly variable (−40° C. to +150° C., for example). The pieces in question can form parts of casings, in particular in an automatic gear box.

Document FR-A-2 759 756 discloses a leaktight coupling of the above-mentioned type in which the tubular insert bears in leaktight manner against two opposite surfaces belonging respectively to the two pieces that are to be connected together. That leaktight coupling gives full satisfaction from the point of view of technical operation, but it nevertheless suffers from the drawback of not making it easy to interconnect the channels in the respective pieces when the channels are offset: it is then necessary to adopt an insert of large diameter or of oval section which is bulky and expensive.

Similarly, when the channels in one of the pieces are very close together, the couplings of document FR-A-2 759 756 are not easy to use since they require relatively large spacing between channels.

OBJECTS AND SUMMARY OF THE INVENTION

A particular object of the present invention is to mitigate those drawbacks.

To this end, according to the invention, a coupling of the kind in question further comprises a rigid intermediate block presenting first and second opposite faces into which a duct passing through said intermediate block opens out, the first face being provided with a sealing-device for pressing in leaktight manner against the first rigid piece so as to isolate said duct, the duct forming a cylindrical housing which extends between the second face of the intermediate block and a shoulder facing towards said second face, and the tubular insert being disposed in said housing with its first bead bearing axially in leaktight manner against the shoulder of said housing and with its second bead projecting from said housing, said second bead being designed to press in leaktight manner against the second rigid piece.

By means of these dispositions, it is possible to make a leaktight connection between channels extending in different pieces, even when the channels are on very different axes: under such circumstances, it is possible for the intermediate block to include an angled duct, and the duct remains relatively small in diameter.

In addition, when the channels in the first piece are very close to one another, it is possible: either to pierce a plurality of parallel ducts in the intermediate block and provide simple O-rings on the second face of said intermediate block pressing against the first rigid piece, when the channels in question correspond to fluid flows that must be kept separate; or else, in the contrary case, to cause the channels to open out into a common duct in the intermediate block.

In preferred embodiments of the invention, it is possible to make use of one or more of the following dispositions:

- the bead of the insert has a peripheral projection of material for limiting sliding of the insert in its housing;
- the housing has a peripheral projection of material for limiting sliding of the insert;
- the sealing device is an elastomer ring overmolded on one of the faces of the intermediate block;
- the sealing device is a tubular insert housed in a housing formed in a duct, said insert comprising a rigid tubular strength member extending axially between first and second open ends covered respectively in first and second elastomer beads, the first bead pressing against a shoulder formed in the housing, and the second bead being for pressing in leaktight manner against the first rigid piece;
- the intermediate block includes a positioning device on one of its faces for bearing against one of the pieces, the positioning device being adapted to cooperate by engaging with at least one of the first and second rigid pieces;
- the tubular strength member of the insert is provided with a continuous elastomer layer which is formed integrally with the first and second beads; and
- the first elastomer bead is elastically compressible over an axial distance of at least millimeters (mm).

BRIEF DESCRIPTION OF THE DRAWINGS

Other characteristics and advantages of the invention appear from the following description of various embodiments given by way of non-limiting example and with reference to the accompanying drawings.

In the drawings:

FIGS. 4 and 5 are detail views of one of the sealing devices in the leaktight coupling shown in FIGS. 1, 2, and 3; and FIG. 6 is a detail view of the edge of one of the housings receiving the insert, forming the sealing device of the leaktight coupling.

MORE DETAILED DESCRIPTION

In the various figures, the same references are used to designate elements that are identical or similar.

Figure 1:
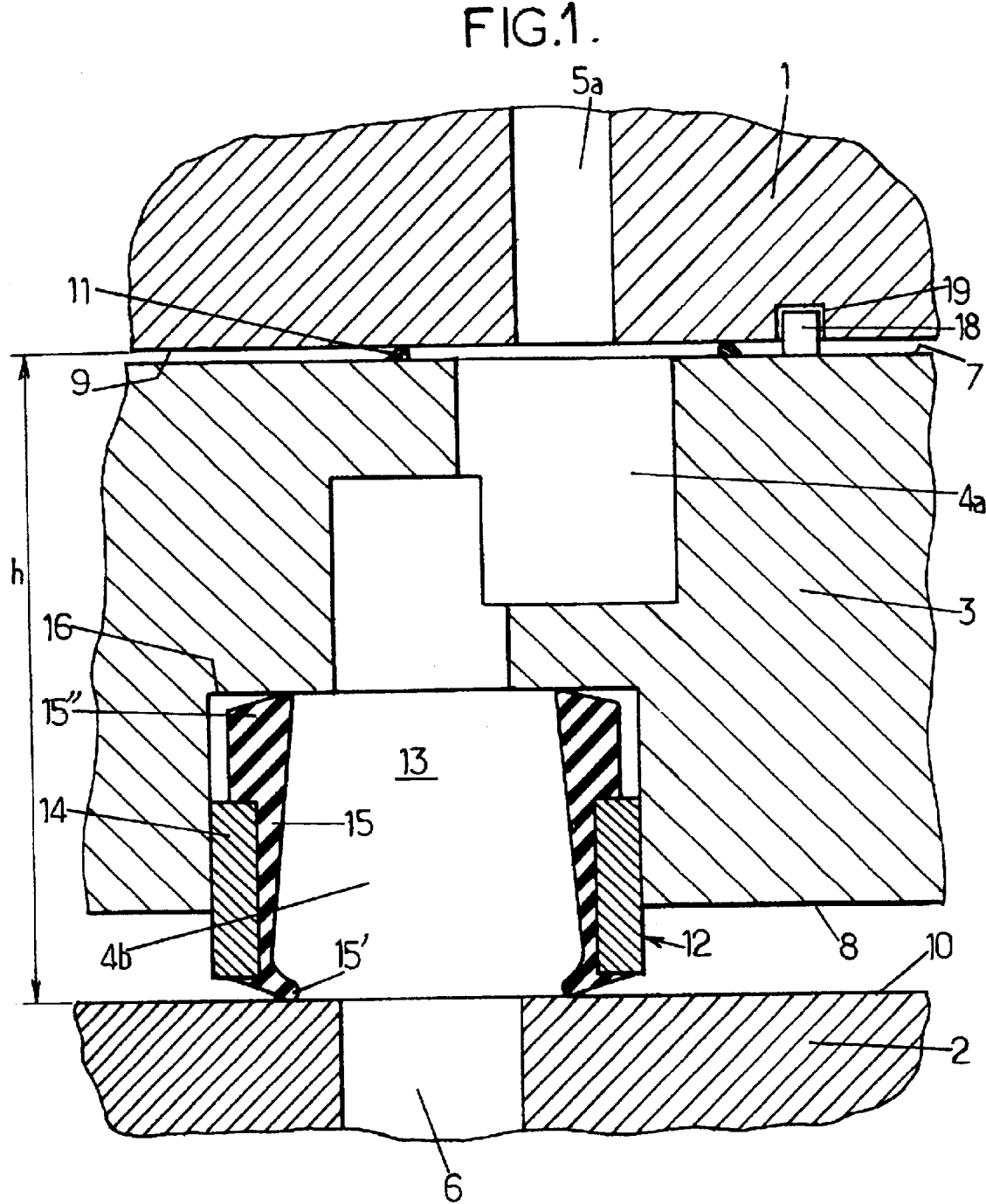
FIGS. 1, 2, and 3 are side elevation views of three different embodiments of the leaktight coupling of the invention.
Figure 2:
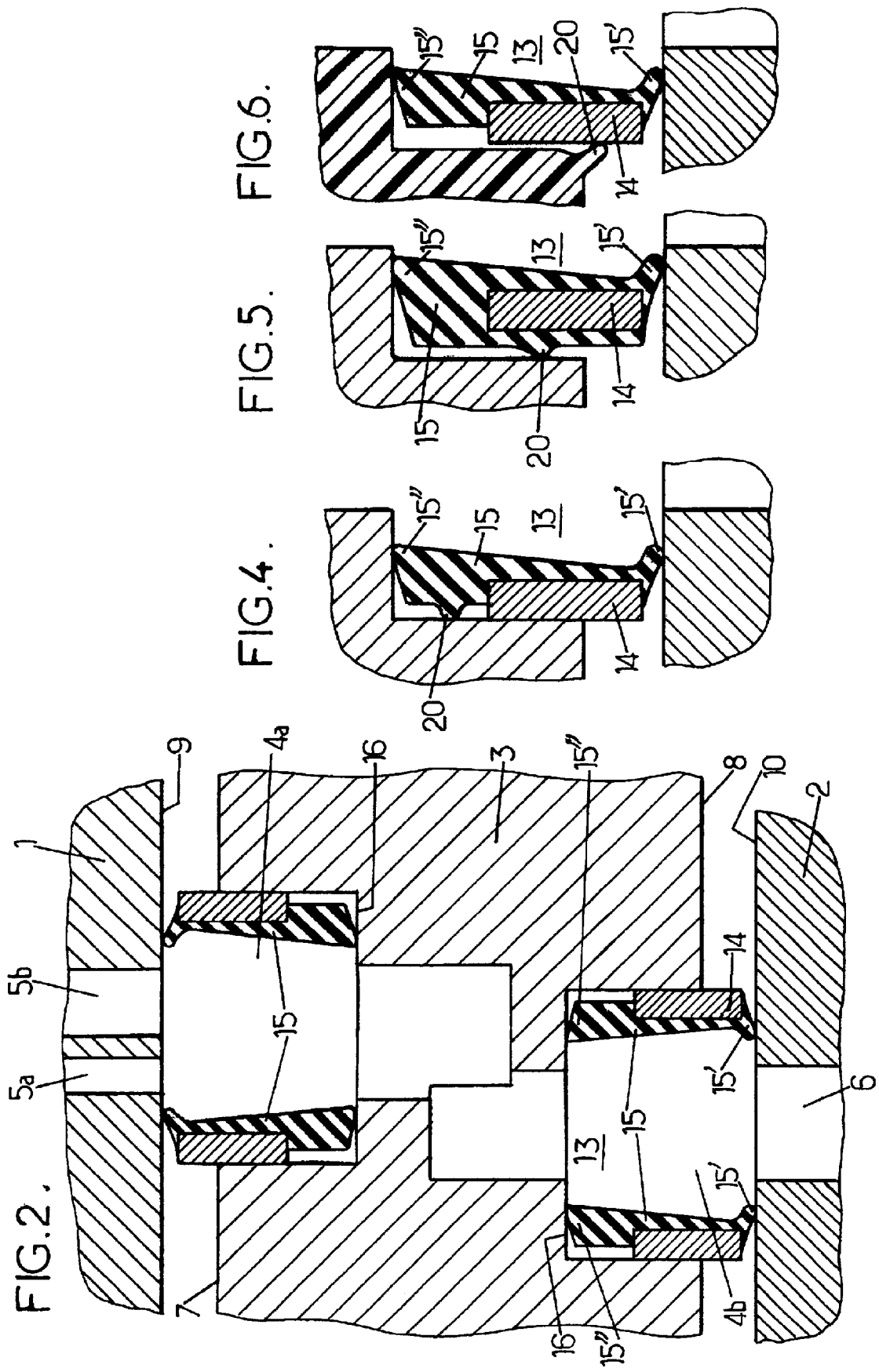

In FIGS. 1 and 2, references 1 and 2 designate two pieces that are spaced apart by a distance h in a zone where a leaktight connection is to be made between these pieces.

The pieces 1 and 2 are pierced by respective channels 5 and 6 that are on axes that are at a considerable offset relative to each other (FIG. 1), and that are connected together in leaktight manner by a coupling including a rigid intermediate block 3, in particular a block made of steel. This intermediate block 3 has at least one duct passing therethrough made up of two segments 4a and 4b of diameter greater than the diameter of the channels 5 and 6, and opening out respectively to these channels that are formed in the pieces 1 and/or 2.

Naturally, the intermediate block 3 could also be made, for example, out of aluminum, of plastics material (PA 6—6 or PPS type resin, possibly filled with glass fibers or the like), or of some other material.

One of the faces 7, 8 of the intermediate block 3 for bearing when assembled against one of the bearing faces 9, 10 of the piece 1 (or the piece 2) includes a sealing device 11, e.g. constituted by an overmolded elastomer ring in register with the open orifice of the duct 4a.

The other face 8 of the intermediate block 3 which is to bear against one of the bearing faces 9, 10 of the other piece 2 (or the piece 1) has a second sealing device 12.

This second sealing device 12 is made from a tubular insert 13, itself comprising:

a rigid tubular strength member 14; and at least one tube 15 of rubber or synthetic elastic material covering at least the ends of said strength member and presenting at said two ends respective first and second beads (15', 15") covering the corresponding end of the strength member, said first and second beads being suitable for being compressed during assembly (for example by about 5 mm) so as to provide leaktightness between one of the bearing faces belonging to one of the pieces 1 and 2 and a shoulder 16 formed in the end wall of the duct 4b.

It will thus be understood that the outer or inner rigid tubular strength member 14 of the insert 13 prevents any significant deformation, and in particular any expansion, of the inner or outer rubber tube 15 that provides a leaktight passage. The ends of the strength member serve to press the end beads (15', 15") of the tube 15 against the piece 1 or 2 and the shoulder 16 formed in the duct 4a, 4b of the intermediate block 3, thus maintaining leaktightness at the ends of the leaktight coupling.

The tubular strength member 14 is advantageously made of metal, implemented as a solid piece or in the form of a braid of metal wires or of inorganic or synthetic fibers, in which case it should not be subjected to axial compression forces.

It will easily be understood that, as shown in FIG. 2, it is possible to replace the sealing device 11 (the elastomer ring) with a second sealing device 12 (tubular insert), with the second device being inserted in a housing in the duct 4a and bearing via one of its beads 15', 15" against a shoulder.

Figure 3:
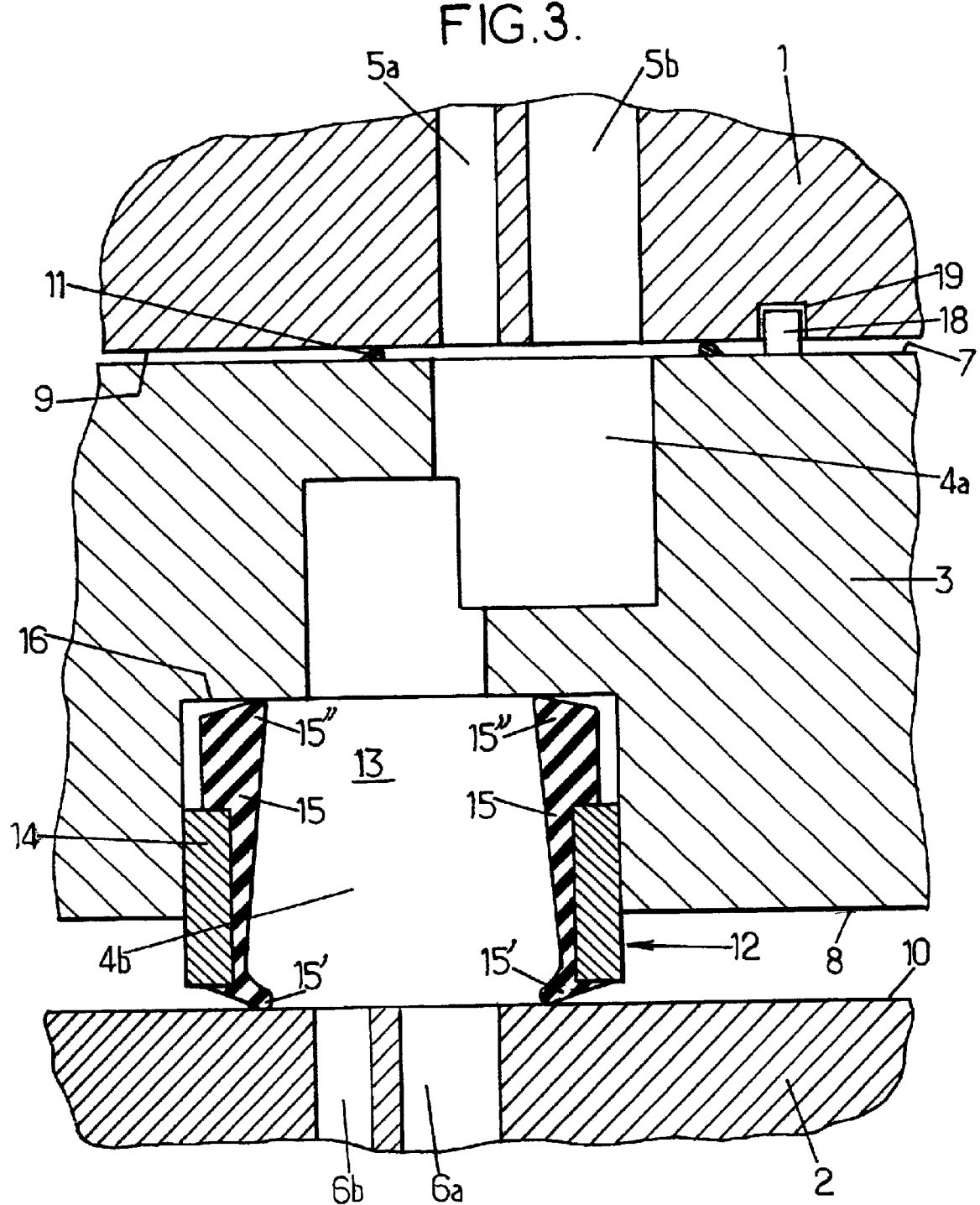

Furthermore, FIG. 3 shows a connection device identical to that shown in FIG. 1 but serving to provide a leaktight connection between very close-together channels 5a and 5b in the piece 1 with channels 6a and 6b situated in the piece 2.

Whatever the embodiment, it can be seen that the thickness of the inserts 13 (measured at rest, i.e. when their end beads are not compressed) is greater than the depth of the housing in which the insert is received, such that when the pieces 1 and 2 are moved towards each other, compression of the beads (15', 15") compensates the wide dispersion that is to be found in practice in the thicknesses of the intermediate blocks 3 and in the varying clearances that are to be found between said block and the pieces 1 and/or 2.

Furthermore, provision is made to place a positioning device 17 on one of the front faces 7, 8 of the intermediate block 3 and the facing face 9 or 10 of the piece 1 or 2, the positioning device 17 being adapted to co-operate by engaging with at least one of the first and second rigid pieces 1, 2. It can be constituted by a peg 18 projecting from the front face 7 or 8 of the intermediate block 3, and co-operating with an orifice 19 formed in one of the pieces 1 or 2.

FIGS. 4, 5, and 6 show various embodiments of devices for limiting sliding of the insert 13 within its housing in the duct 4a, 4b.

Thus, in FIG. 4 a projection of material 20, in particular of elastomer, is formed integrally with one of the beads 5', 5" situated at the end of the insert 13.

In FIG. 5, this projection of material 20 is formed on the peripheral outer surface of the insert 13 and is made during overmolding.

In FIG. 6, the projection of material 20 is formed by a lip situated in register with the outlet orifice from the housing receiving the insert 13.

Whatever the embodiment, the projection of material 20 serves to generate friction between the insert 13 and a wall of the duct 4a, 4b in which it is received, thus limiting movement thereof.

What is claimed is:

1. A leaktight coupling for interconnecting channels formed respectively in first and second rigid pieces that are secured to each other, the leaktight coupling comprising at least one tubular insert including a rigid tubular strength member extending axially between first and second open ends, said first and second ends being covered with respective first and second elastomer beads which project axially beyond the corresponding end of the tubular strength member, the coupling further comprising a rigid intermediate block presenting first and second opposite faces into which a duct passing through said intermediate block opens out, the first face being provided with a sealing device for pressing in leaktight manner against the first rigid piece so as to isolate said duct, the duct forming a cylindrical housing which extends between the second face of the intermediate block and a shoulder facing towards said second face, and the tubular insert being disposed in said housing with its first bead bearing axially in leaktight manner against the shoulder of said housing and with its second bead projecting from said housing, said second bead being designed to press in leaktight manner against the second rigid piece, wherein the bead of the insert has a peripheral projection of material for limiting sliding of the insert in its housing.

2. A leaktight coupling for interconnecting channels formed respectively in first and second rigid pieces that are secured to each other, the leaktight coupling comprising at least one tubular insert including a rigid tubular strength member extending axially between first and second open ends, said first and second ends being covered with respective first and second elastomer beads which project axially beyond the corresponding end of the tubular strength member, the coupling further comprising a rigid intermediate block presenting first and second opposite faces into which a duct passing through said intermediate block opens out, the first face being provided with a sealing device for pressing in leaktight manner against the first rigid piece so as to isolate said duct, the duct forming a cylindrical housing which extends between the second face of the intermediate block and a shoulder facing towards said second face, and the tubular insert being disposed in said housing with its first bead bearing axially in leaktight manner against the shoulder of said housing and with its second bead projecting from said housing, said second bead being designed to press in leaktight manner against the second rigid piece, wherein the housing has a peripheral projection of material for limiting sliding of the insert.

3. A leaktight coupling for interconnecting channels formed respectively in first and second rigid pieces that are secured to each other, the leaktight coupling comprising at least one tubular insert including a rigid tubular strength member extending axially between first and second open ends, said first and second ends being covered with respective first and second elastomer beads which project axially beyond the corresponding end of the tubular strength member, the coupling further comprising a rigid intermediate block presenting first and second opposite faces into which a duct passing through said intermediate block opens out, the first face being provided with a sealing device for pressing in leaktight manner against the first rigid piece so as to isolate said duct, the duct forming a cylindrical housing which extends between the second face of the intermediate block and a shoulder facing towards said second face, and the tubular insert being disposed in said housing with its first bead bearing axially in leaktight manner against the shoulder of said housing and with its second bead projecting from said housing, said second bead being designed to press in leaktight manner against the second rigid piece, wherein the sealing device is an elastomer ring overmolded on one of the faces of the intermediate block.

4. A leaktight coupling for interconnecting channels formed respectively in first and second rigid pieces that are secured to each other, the leaktight coupling comprising at least one tubular insert including a rigid tubular strength member extending axially between first and second oven ends, said first and second ends being covered with respective first and second elastomer beads which project axially beyond the corresponding end of the tubular strength member, the coupling further comprising a rigid intermediate block presenting first and second opposite faces into which a duct passing through said intermediate block opens out, the first face being provided with a sealing device for pressing in leaktight manner against the first rigid piece so as to isolate said duct, the duct forming a cylindrical housing which extends between the second face of the intermediate block and a shoulder facing towards said second face, and the tubular insert being disposed in said housing with its first bead bearing axially in leaktight manner against the shoulder of said housing and with its second bead projecting from said housing, said second bead being designed to press in leaktight manner against the second rigid piece, wherein the sealing device is a tubular insert housed in a housing formed in a duct, said insert comprising a rigid tubular strength member extending axially between first and second open ends covered respectively in first and second elastomer beads, the first bead pressing against a shoulder formed in the housing, and the second bead being for pressing in leaktight manner against the first rigid piece.

5. A leaktight device including:
first and second rigid pieces that are secured to each other,
and a connection device interconnecting channels formed respectively in said first and second rigid pieces, said connection device comprising at least one tubular elongated insert including a rigid tubular strength member extending axially in a longitudinal direction between first and second open ends, said first and second ends being covered with respective first and second elastomer bead which project axially the corresponding end of the tubular strength member, the connection device further comprising a rigid intermediate block presenting first and second opposite faces into which a duct passing through said intermediate block opens out, the first face being provided with a sealing device pressing in leaktight manner against the first rigid piece so as to isolate said duct, the duct forming a cylindrical housing which extends between the second face of the intermediate block and a shoulder facing towards said second face, and the tubular insert being disposed in said housing with its first bead bearing axially in leaktight manner against the shoulder of said housing and with its second bead projecting from said housing, wherein said strength member does not engage the first rigid piece.

6. A connection device according to claim 5, in which the intermediate block includes a positioning device on one of its faces for bearing against one of the pieces, the positioning device being adapted to co-operate by engaging with at least one of the first and second rigid pieces.

7. A connection device according to claim 5, in which the tubular strength member of the insert is provided with a continuous elastomer layer which is formed integrally with the first and second beads.

8. A connection device according to claim 5, in which the first elastomer bead is elastically compressible over an axial distance of at least 5 mm.

9. A leaktight device according to claim 5, in which the tubular strength member of the tubular insert is fitted in the cylindrical housing of the intermediate block, in direct contact with said intermediate block.

10. A leaktight device including:
first and second rigid pieces that are secured to each other,
and a connection device interconnecting channels formed respectively in said first and second rigid pieces, said connection device comprising at least one tubular elongated insert including a rigid tubular strength member extending axially in a longitudinal direction between first and second open ends, said first and second ends being covered with respective first and second elastomer bead which project axially the corresponding end of the tubular strength member, the connection device further comprising a rigid intermediate block presenting first and second opposite faces into which a duct passing through said intermediate block opens out, the first face being provided with a sealing device pressing in leaktight manner against the first rigid piece so as to isolate said duct, the duct forming a cylindrical housing which extends between the second face of the intermediate block and a shoulder facing towards said second face, and the tubular insert being disposed in said housing with its first bead bearing axially in leaktight manner against the shoulder of said housing and with its second bead projecting from said housing, wherein the first bead deforms inwardly.

11. A leaktight device according to claim 10, in which the tubular strength member of the tubular insert is fitted in the cylindrical housing of the intermediate block, in direct contact with said intermediate block.

12. A connection device according to claim 10, in which the intermediate block includes a positioning device on one of its faces for bearing against one of the pieces, the positioning device being adapted to co-operate by engaging with at least one of the first and second rigid pieces.

13. A connection device according to claim 10, in which the tubular strength member of the insert is provided with a continuous elastomer layer which is formed integrally with the first and second beads.

14. A connection device according to claim 10, in which the first elastomer bead is elastically compressible over an axial distance of at least 5 mm.

* * * * *